United States Patent [19]

Nightingale

[11] Patent Number: 5,297,388
[45] Date of Patent: Mar. 29, 1994

[54] FLUID FLOW DUCT WITH ALTERNATIVE OUTLETS

[75] Inventor: Douglas J. Nightingale, Jonesboro, Ga.

[73] Assignee: Rolls-Royce Inc., Reston, Va.

[21] Appl. No.: 867,465

[22] Filed: Apr. 13, 1992

[51] Int. Cl.[5] .................................... F02K 1/00
[52] U.S. Cl. ............................. 60/229; 60/230; 239/265.31
[58] Field of Search .............. 60/230, 232, 226.2, 60/229, 222; 239/265.19, 265.25, 265.27, 265.29, 265.31

[56] References Cited

U.S. PATENT DOCUMENTS

| | | | |
|---|---|---|---|
| 4,030,291 | 6/1977 | Sargisson | 60/226.2 |
| 4,145,877 | 3/1979 | Montgomery | 60/230 |
| 4,731,991 | 3/1988 | Newton | 60/226.2 |
| 4,930,307 | 6/1990 | Newton | 60/226.2 |
| 5,054,285 | 10/1991 | Geidel | 60/226.2 |

FOREIGN PATENT DOCUMENTS 1227044  3/1971 United Kingdom ............... 60/230

*Primary Examiner*—Ricard A. Bertsch
*Assistant Examiner*—W. J. Wicker
*Attorney, Agent, or Firm*—Oliff & Berridge

[57] ABSTRACT

A fluid flow duct such as the jet pipe of an aircraft gas turbine powerplant has alternatively selectable outlets so that thrust may be directed through either an axial discharge nozzle or through vectorable lift nozzles. Side outlets in the jet pipe leads to lift nozzle on port and starboard sides of the aircraft. Nozzle selection is made by means of a composite diverter valve comprising a sleeve valve to cover the side outlets and a segmented blocker valve to close the jet pipe and deflect engine exhaust through the side outlets. The blocker valve segments are carried on the sleeve valve for simultaneous deployment. The segments are adapted to delay the opening of the side outlets as the sleeve valve translates axially. Specially extended segments co-operate with a shaped duct wall adjacent the outlets to delay their uncovering.

19 Claims, 4 Drawing Sheets

FLUID FLOW DUCT WITH ALTERNATIVE OUTLETS

FIELD OF THE INVENTION

The Invention concerns a fluid flow duct having alternatively selectable flow exits. In particular, the invention relates to an aircraft power plant of the type having alternatively selectable vectored thrust and axial thrust nozzles.

BACKGROUND OF THE INVENTION

An engine of this type is described in U.S. Pat. No. 3,280,560. Essentially it is a by-pass type engine which has a conventional axial type discharge nozzle for normal forward propulsive thrust in wing-borne flight. For jet-borne flight the by-pass and exhaust flows are selectively diverted. The cold by-pass flow is discharged through a pair of forward mounted vectorable nozzles on port and starboard sides of the engine. The hot turbine exhaust is also blocked by a diverter valve, in this case of the "clamshell" type. The valve members divert the axial flow to discharge through rearward mounted, also port and starboard, vectorable nozzles. The clamshell valves each comprise a fragment of a cylinder with oblique upstream and downstream edges. The valve members are mounted on vertical trunnions so they can be swung between a first position in which each blocks a side exit aperture in the jet pipe wall and a second position in which they come together to block flow to the axial nozzle.

A drawback with this type of arrangement arises due to area mismatching. During transition between operating modes the total effective outlet area, immediately downstream of the turbine section, undergoes a substantial although temporary increase even if the jet pipe and side outlet areas are closely matched. This occurs as the clamshell valves begin to uncover the side outlets and to block the jet pipe. Unfortunately the initial effect of the latter is overwhelmed by initial effect of opening the side exits.

A different type of valve arrangement which may be adapted to divert gas flows is disclosed in U.S. Pat. No. 4,587,803. The engine described therein has a tandem fan arrangement with a changeover valve between the fans to selectively divert flow from the front fan either through an axial duct leading to the second fan or through side exits exhausting to atmosphere. A sleeve valve blocks or uncovers the side exits by moving axially. Pivoted to the sleeve valve are a plurality of valve segments which are restrained by a fixed length link thereby causing the segments to pivot inwardly to block the axial duct as the sleeve is translated rearwards. This arrangement may be adapted for hot exhaust gas flows by the use of suitable materials to construct the clamshell valve members described above.

Both valve arrangement suffer from the same drawback of area mismatch. The present invention has for its primary objective to provide a solution to this problem.

SUMMARY OF THE INVENTION

According to the invention in its broadest form there is provided a fluid flow duct having a flow entry and alternatively selectable first and second flow exits, wherein an upstream end of the duct defines the flow entry, at least one side aperture formed in the duct wall defines the first flow exit, and a downstream end of the duct defines the second flow exit, and includes valve means for alternatively blocking the first flow exit or the second flow exit, said valve means comprising:

axially translatable first valve means for selectively blocking the first flow exit, in the form of a sleeve having an upstream end and a downstream end;

second valve means for selectively blocking the second flow exit, in the form of a circular array of valve segments carried on the upstream end of the first valve means and arranged to deploy to lie transversely of the duct to block the second exit when the first valve means is translated in a downstream direction to uncover the first flow exit;

characterised in that:

each segment of the second valve means is pivotally attached to the sleeve of the first valve means at an attachment location towards the circumference of the valve array and the segments at least in the region of a side exit have extended tips which project upstream of the attachment location such that during initial deployment of the valve means the extended segment tips sweep outwardly of the first valve means, and the duct wall is correspondingly profiled to co-operate with the extended segment tips whereby t delay opening of the side flow exit by the first valve means.

According to another aspect of the invention there is provided an aircraft powerplant comprising a gas turbine engine exhausting into a jet pipe having alternatively selectable first and second nozzle means, wherein at least one side aperture in the jet pipe defines a first flow exit communicating with first nozzle means and a downstream end of the jet pipe exhausts through second nozzle means, and includes valve means for alternatively blocking the first or second nozzle means and diverting the exhaust accordingly, said valve means comprising:

axially translatable first valve means for selectively blocking the first flow exit, in the form of a sleeve having an upstream end and a downstream end;

second valve means for selectively blocking the second flow exit, in the form of a circular array of valve segments carried on the upstream end of the first valve means and arranged to deploy transversely across the duct to block the second flow exit when the first valve means is translated in a downstream direction to unblock the first flow exit;

characterised in that:

each segment of the second valve means is pivotally attached to the sleeve of the first valve means at an attachment location toward the circumference of the valve array, and the segments at least in the region of a first flow exit have extended tips which project upstream of the attachment location to overlap an adjacent region of the jet pipe wall, such that during initial deployment of the valve means the extended tips of the segments of the second valve means sweep outwardly of the first valve means, and the jet pipe wall has a corresponding profile whereby to delay uncovering the first flow exit by the first valve means relative to blocking of the second flow exit by the second valve means.

BRIEF DESCRIPTION OF THE DRAWINGS

The invention and how it may be carried into practice will now be described with reference by way of example to an embodiment illustrated in the accompanying drawings, in which FIG. 1 shows a schematic general assembly of a complete engine of the kind referred to;

DETAILED DESCRIPTION OF THE INVENTION

Figure 1:
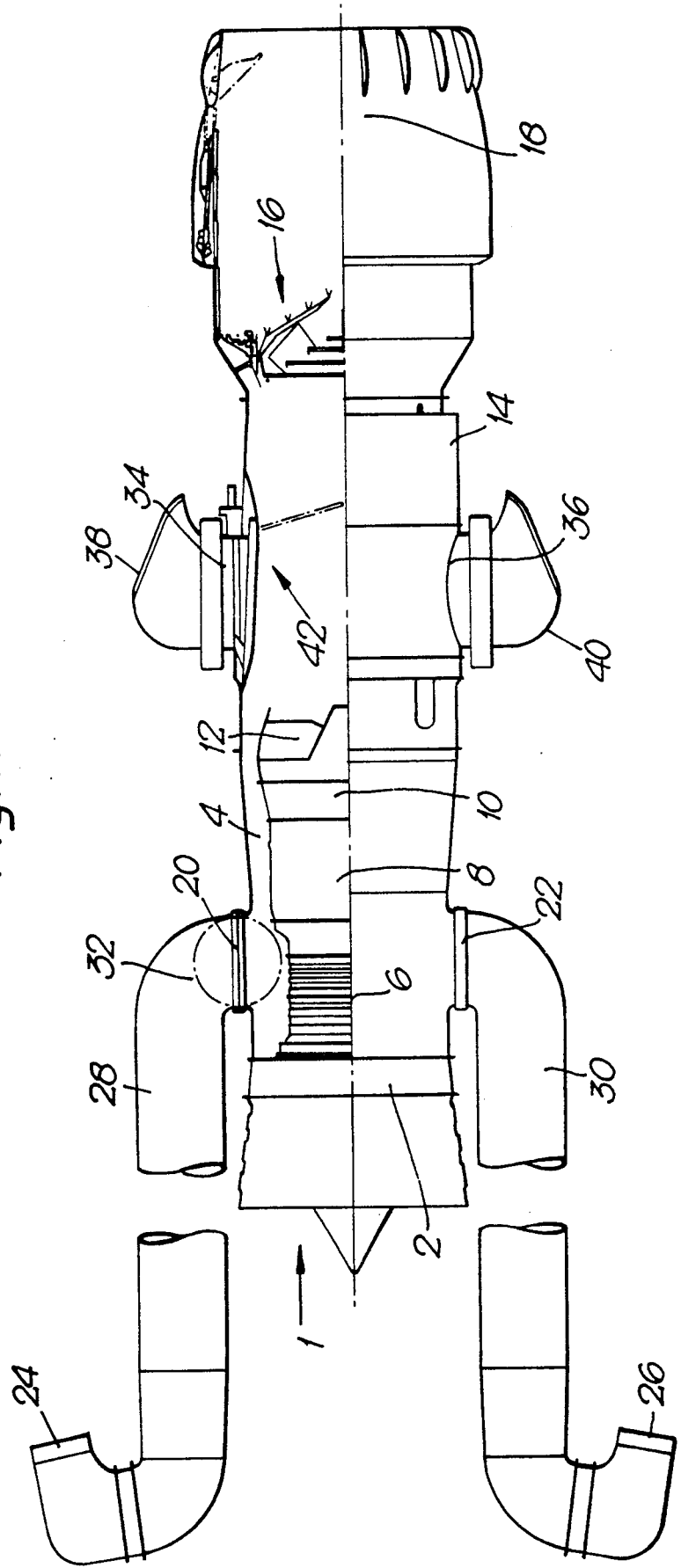

Referring first to FIG. 1 a basic layout of an engine having selectively alternative side discharge and axial discharge nozzles is shown in part cut-away form. The engine is cut-away above the centre line, to reveal internal features such as the location of the side outlets and the diverter valve means.

In its general layout the engine has an air intake 1, a front fan at 2, and leading from the rear face thereof an annular by-pass duct 4 surrounding a compressor section 6. Air from the compressor section feeds a combustor section at 8. The hot exhaust from a turbine section at 10 passes through a mixer nozzle 12 into a jet pipe 14. The jet pipe 14 may contain an afterburner system indicated generally at 16. The jet pipe terminates in an axial discharge nozzle 18 in the form of a variable area propulsion nozzle.

In the drawing nozzle 18 is shown as being of a conventional axisymmetric and non-vectoring type. Other types of nozzle including vectoring may be employed.

The engine is provided with valve means for selectively diverting cold air from the by-pass duct and hot gas from the core turbine. Towards the front part of the by-pass duct 4 there is provided side outlet means 20, 22 through which cold by-pass air may be selectively diverted to vertical lift nozzle means 24, 26. The particular embodiment illustrated has two side outlet ports on opposite, i.e. port and starboard, sides of the engine by-pass duct. Each outlet port 20, 22 communicates via respective ducts 28, 30 with separate lift nozzles 24, 26. In an alternative embodiment (not shown) there may be one by-pass air side outlet means and one vertical lift cold air nozzle. Neither is it essential to the present invention for the by-pass duct air to be switched separately.

In practice, there are a number of possibilities for combinations of outlet ports and lift nozzles, vectorable or otherwise, according to airframe requirements. Also the outlet ports could supply by-pass air directly to the lift nozzles as described in U.S. Pat. No. 3,280,560 and similar to the arrangement found in the Rolls-Royce PEGASUS engine, thus dispensing with the ducts leading to more remotely positioned nozzles.

Side outlet means is provided at 34, 36 for hot turbine exhaust gas diverted from the jet pipe 14. In the particular embodiment illustrated port and starboard side outlet ports 34, 36 are formed in opposite sides of jet pipe and towards its upstream end. Ports 34, 36 lead directly into port and starboard vectoring nozzles 38, 40 on opposite sides of the engine. Adjacent the side outlet means there is provided diverter valve means generally indicated at 42. The construction and operation of the valve means comprising a sleeve valve 44 and a blocker valve 46 is shown in greater detail in FIGS. 2a to 2e.

Figure 3:
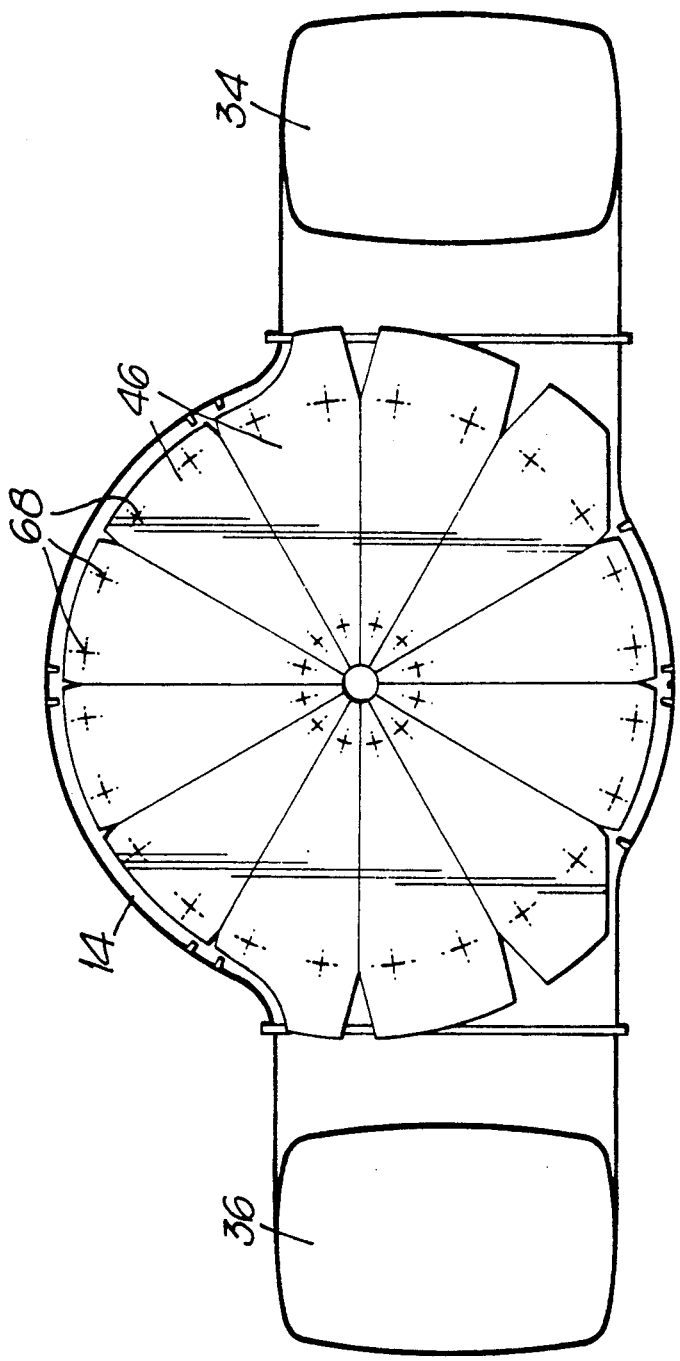
FIG. 3 shows an axial view of the jet pipe blocker valve.

FIG. 3 is an axial view looking aft at the blocker valve 46 when deployed. In particular, FIG. 3 shows the blocker valve in relation to the side outlet ports 34, 36 which communicate with the vectorable lift nozzles 38, 40.

Figure 2A:
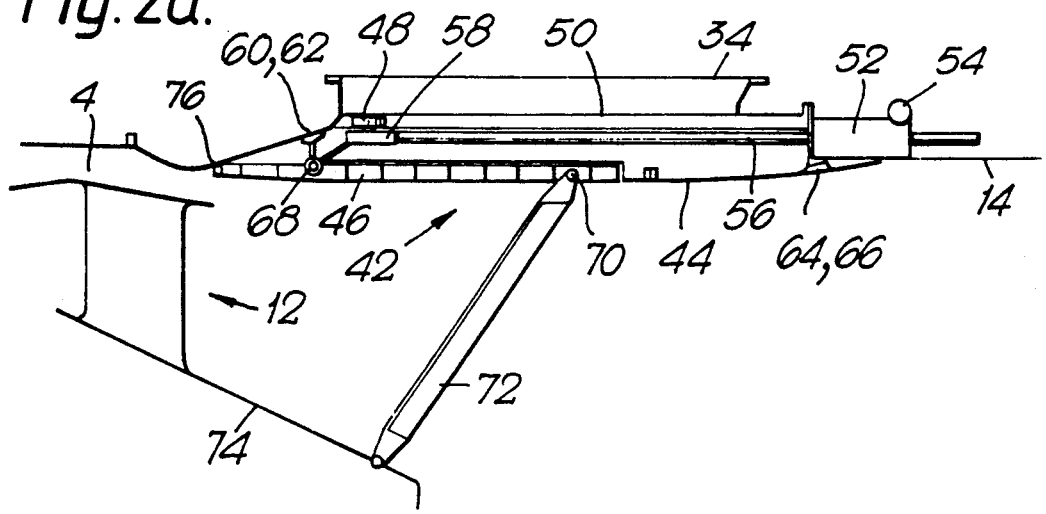
FIG. 2a to FIG. 2e show a more detailed view of the valve means in five successive stage of deployment.
Figure 2B:
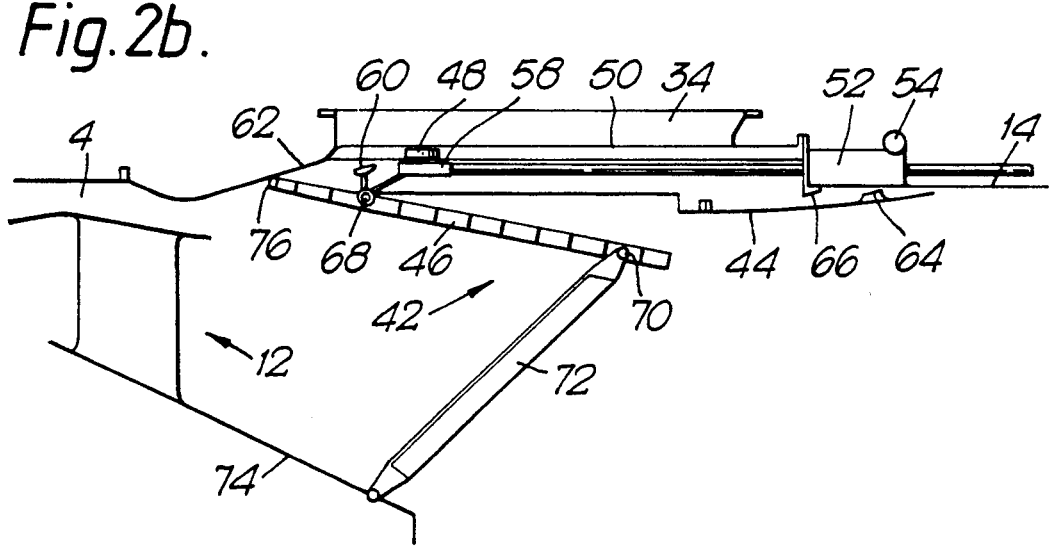

FIG. 2a shows a side exit port 34 closed by a first or sleeve valve means 44. The second or blocker valve means comprises a multiplicity of valve segments 46, a total of twelve in the present example. When deployed as shown in FIG. 3 these combine in a circular array to block duct 14. In the stowed, or undeployed, configuration of FIG. 2a the valve segments 46 are housed against the radially inner face of sleeve valve 44. The subsequent drawings through FIG. 2e show successive stages of deployment of both valves. As the sleeve valve 44 is translated axially in a rearward direction the diverter valve segments 46 move from positions parallel to the axis of the jet pipe (FIG. 2a) to lie in a plane perpendicular to the axis of the jet pipe (FIG. 2e).

The axially translatable sleeve comprises an annular structure 44 concentric with the jet pipe 14. It has an upstream end, that is towards the turbine exhaust mixer nozzle 12, which is supported and guided by guide rollers 48 running in tracks 50, also to be seen in FIG. 3. There are a plurality of such tracks spaced apart circumferentially around the jet pipe. The sleeve valve 44 is driven by a plurality of actuators 52 mounted on the outside of the jet pipe. Typically there may be four actuators also spaced apart circumferentially around the jet pipe 14. In the particular example illustrated these are recirculating ballscrew type actuators energised by a common rotary torsional-cable drive 54 which encircles the jet pipe. Other types of actuator may be utilised, for example, having hydraulic drive.

An actuator output rod 56 is connected to a drive bracket 58 towards the upstream end of the sleeve which also carries a guide roller 48. The forwardmost part of the annular sleeve structure 44 mounts an annular seal member 60 which, in the closed position of FIG. 2a, abuts a port 62 of the jet pipe wall adjacent the upstream edge of the side outlet ports 34, 36. Towards the downstream end of the sleeve 44 it also carries a further annular seal member 64 which, again in the closed position of FIG. 2a abuts a complementary annular sealing member 66 formed adjacent the downstream edge of the side outlet ports 34, 36. Thus, when the sleeve 44 is in its upstream position shown in FIG. 2a the ports 34, 36 are closed and sealed.

The blocker valve segments 46 lay against the inner face of sleeve valve 44 in its extreme upstream position, FIG. 2a. Preferably the inner surface of the valve member is profiled to receive the segments in the stowed position so as to form a flush inner valve surface. Each valve segment 46 generally has the shape of a segment of a circle as will be readily appreciated from FIG. 3. With reference to the disposition of the blocker valve in FIG. 3, the segments 46 are pivotally mounted at 68 towards their radially outer margins to the upstream edge of the structure of sleeve valve 44. The radially inner portions of the segment 46 are pivoted at 70 to one end of a restraining strut 72. The other end of strut 72 is pivoted to a turbine exhaust cone 74 which forms an axisymmetric centre body downstream of mixer nozzle 12. The angular position of the second or blocker valve segments relative to the first or sleeve valve is therefore controlled by strut 72. The exact location of pivots 68 and 70 and the length of the link strut 72 are chosen so that segments 46 are perpendicular to the engine axis in the disposition of FIG. 2e, and parallel to the axis against the inner surface of sleeve valve 44 in the disposition of FIG. 2a. The strut 72 must not pass "over-centre" during operation otherwise the mechanism would tend to lock. Preferably it is inclined in a downstream direction as in FIG. 2a and is nearly parallel to the engine axis in FIG. 2e.

Thus, in use, when the valve means 42 is deployed as depicted in the sequence of FIGS. 2a to 2e: the sleeve valve 44 translates axially in a downstream direction and uncovers the ports 34, 36; the movement of sleeve 44 carries the pivots 68 supporting valve segments 46 also in an axial direction; meanwhile, restraining links 72 rotate about fixed pivots 68 and pull the downstream ends of valve segments 46 radially inwards into the blocking position of FIG. 2e and FIG. 3.

As will be evident from the view of FIG. 3 the valve segments 46 in the region of the side outlet ports 34, 36 extend radially outwards at 76 in the deployed position into the port apertures 34, 36. In the stowed position of FIG. 2a the segment tips 76 project forward of the upstream lip of the sleeve valve 44. The purpose of these extended segment tips is to delay opening of the side ports 34, 36 as will be apparent from inspection of FIG. 2a to FIG. 2c inclusive.

The portion 62 of the duct wall immediately upstream of the side ports 34, 36 is profiled to form a ramp section extending in a radially outward direction to accommodate the locii of the sweep of the segment tips 76. The surface swept by these tips is determined by the compound movement of the axially translating sleeve valve and the pivotally moving blocker valve. Thus, the segment tips describe an arc about the pivot centres 68 while those pivots translate axially. The tips of the second valve means therefore sweep outwardly of the first valve means. The duct wall in the region 62 is shaped in three-dimensions to follow closely the surface swept by the segment tips.

Figure 2C:
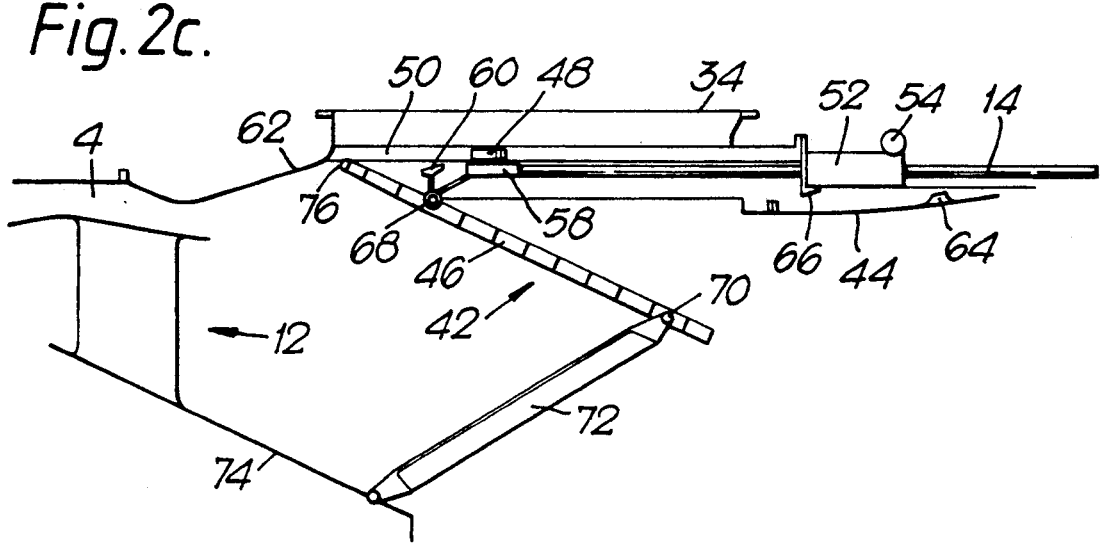
Figure 2D:
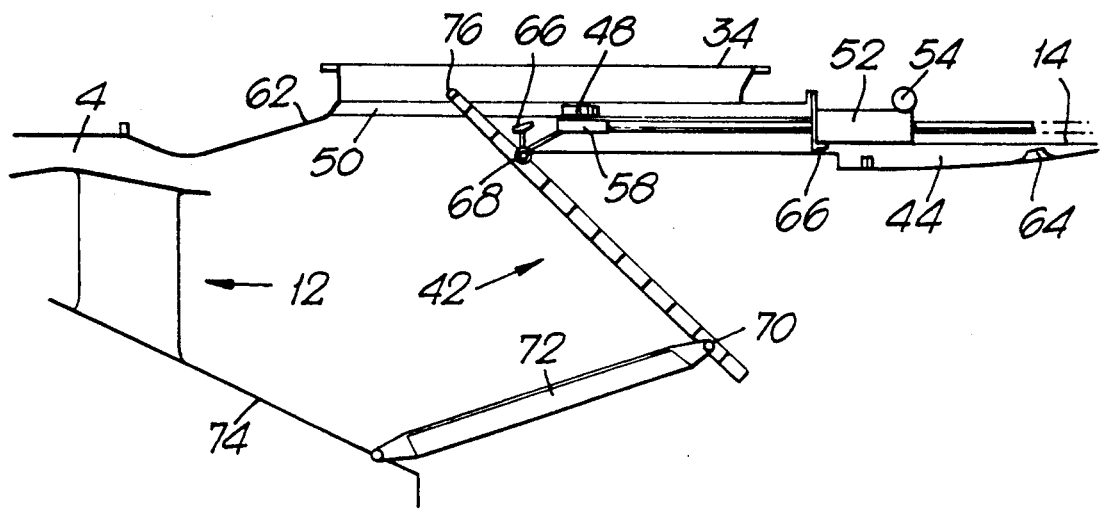
Figure 2E:
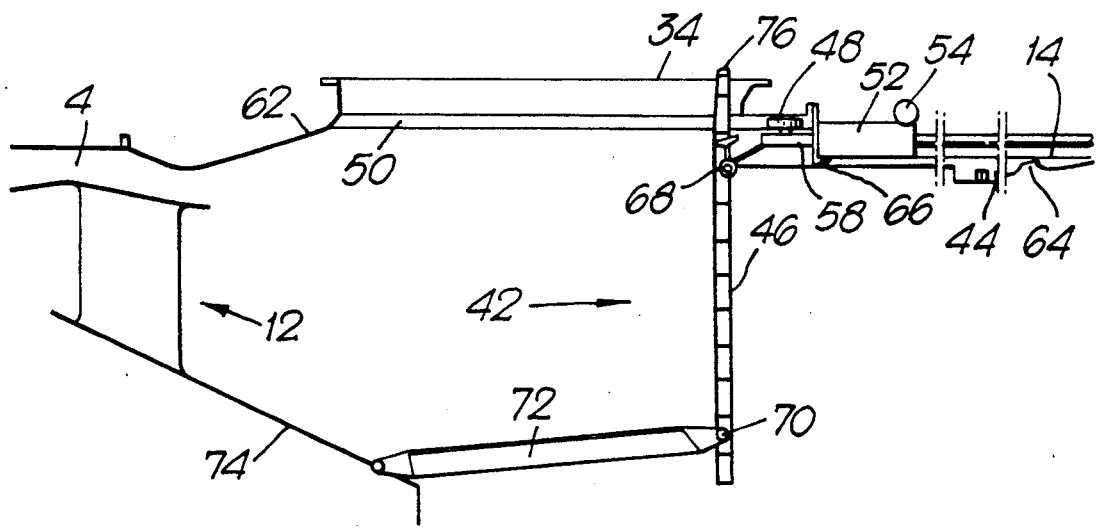

The duct wall at 62 is ramped towards the upstream edges of the side outlet ports 34, 36 so that the ports effectively remain closed until the valve members reach the positions shown in FIG. 2c. That is, when the upstream edge of sleeve valve 44 has transversed approximately one third distance across the ports. At that position the valve segments 46 will have reached a sufficiently inclined angle to begin significantly to restrict axial flow along jet pipe 24. As the tips 76 of the valve segments depart the profiled portion 62 of the duct wall gas may commence flowing through ports 34, 36 into the side positioned lift nozzles 38, 40. Further movement of sleeve valve member 44 drives the valve segments 46 through the mid-positions of FIG. 2d to the final blocking position of FIG. 2c while continuing to open the side outlet ports progressively. In the final valve position the ports are fully open and the jet pipe is fully blocked. Substantially, all of the gas flow from turbine mixer nozzle 12 is then directed through the side ports. The effective delay in opening of the side ports introduced by the extended tips 76 maintains a reasonably constant pressure differential across the core engine turbine, upstream of mixer nozzle 12. This helps to prevent a sudden pressure drop which could precipitate engine malfunction due to mismatch and, or alternatively, fan flutter.

In reverse operation, the actuators 52 are energised in an opposite sense and drive the valve members through a reverse sequence from FIG. 2e to FIG. 2a. Now as the flow through the side ports is progressively restricted as the valve segments first "crack-open" and then progressively move apart to restore axial flow to jet pipe 14. By the time the valve positions of FIG. 2c are achieved axial flow is almost fully restored and diverted flow can cease. At this point the extended tips 76 of the valve segments begin to sweep close to the duct wall again substantially cutting-off diverted flow.

A clearance gap may be maintained during valve movement to avoid wear. Gas sealing in the closed position is provided by the seal member 60. In the example illustrated erosion at the segment tips is not an issue because the tips reside in relatively cool bypass duct airstream in the closed position.

Some relieving of the radially outer edges 78 of the blocker valve segments 46 will be observed in FIG. 3. This is particularly evident in respect of the valve segments having extended tips. Outboard of the pitch circle of the radially outer pivot mounts 68 the sides of the segments are inclined relative to a radius. The adjacent edges of neighbouring segments form a V-notch. In fact, in this region the edges of a segment are parallel. When the valve segments 46 are moved to their stowed positions, therefore, the edges of adjacent segments abut one against another.

In the embodiment illustrated the axis of the side outlet ports 34, 36 is offset relative to the axis of the jet pipe 14. This is apparent from consideration of the cross-sectioned view of FIG. 3. This is not the only possible arrangement, of course. It will be readily appreciated that the invention may be adopted in other porting configurations. For example, it will be obvious to one skilled in the art how the invention as described may be adapted for arrangements in which the axis of the side outlet ports intersects the axis of the jet pipe diametrically, or in which there may be only a single outlet port. There may also be a plurality of outlet ports.

I claim:

1. An aircraft power plant providing selectively vectorable thrust comprising:
   a bypass gas turbine engine having a core engine and a bypass duct surrounding the core engine, said core engine and bypass duct, in operation, exhausting gas into a common flow duct,
   said common flow duct comprising a jet pipe for carrying hot exhaust flow from a turbine section of the core engine and relatively cooler bypassflow from the bypass duct,
   said jet pipe having a substantially cylindrical wall one end of which defines an upstream flow entry, at least one side aperture which defines a first flow exit for vectored thrust, and a downstream end which defines a second flow exit for axial thrust,
   diverter valve means located in the jet pipe for opening one of the first flow exit and the second flow exit and blocking the other of the first flow exit and the second flow exit, to divert said hot exhaust flow from the turbine section and said bypass flow from the bypass duct,
   said valve means comprising:
      axially translatable first valve means for selectively blocking the first flow exit, the first valve means comprising a sleeve housed within the duct and having an upstream end and a downstream end, and
      pivotally movable second valve means for selectively blocking the second flow exit, the second valve means being a circular array of valve segments each of which is pivotally attached to the upstream end of the sleeve of the first valve means whereby said segments lie flush with inner faces of the first valve means in a stowed position, said segments being arranged to deploy transversely across the duct to block the second flow exit when the first valve means is translated in a downstream direction to open the first flow exit, at least some of segments in the region of the first flow exit having extended tips which sweep a region of the jet pipe wall adjacent to the region of the first flow exit as the second valve means begins to deploy transversely across the duct, wherein said adjacent region of the jet pipe wall is an outwardly sloping ramp section formed with a profile such that during initial deployment of the valve means the extended tips of the segments of the second valve means sweep outwardly of the first valve means and cooperate with the ramp section to delay uncovering of the first flow exit by the first valve means relative to blocking of the second flow exit by the second valve means.

2. An aircraft powerplant as claimed in claim 1 wherein the inner faces of the first valve means is profiled to receive the segments of the second valve means.

3. An aircraft powerplant as claimed in claim 1 wherein the segments in the region of the first flow exit are of greater length than segments that are not in the region of the first flow exit, so that the extended tips extend farther from a center of the circular array of valve segments than tips of the segments that are not in the region of the first flow exit.

4. An aircraft powerplant as claimed in claim 1 wherein the extended tips sweep outwardly of the entire first valve means.

5. An aircraft powerplant as claimed in claim 1 wherein the first flow exit comprises apertures formed on opposite sides of the jet pipe.

6. An aircraft powerplant as claimed in claim 5 wherein said apertures are formed on port and starboard sides of the jet pipe.

7. An aircraft powerplant as claimed in claim 1 wherein the angular position of a second valve segment relative to the first valve sleeve is controlled by a strut having a first end pivotally attached towards the radially inner end of the segment.

8. An aircraft powerplant as claimed in claim 7 wherein the strut has a second end opposite to the first end pivotally attached to an axial exhaust cone of the core engine.

9. A fluid flow duct and diverter valve for a jet pipe of a selectively vectorable thrust jet engine of the by-pass type, comprising:

a substantially circular duct downstream of an engine turbine exit and a bypass duct exit and having an upstream end which defines a flow entry for receiving turbine and bypass flow;

alternatively selectable exits including a first flow exit for vectored thrust and a second flow exit for axial thrust, at least one side aperture formed in a wall of the substantially circular duct defining the first vectored thrust flow exit; and diverter valve means for alternatively blocking the first vectored thrust flow exit or the second axial thrust flow exit;

said diverter valve means comprising:

axially translatable first valve means for selectively blocking the first flow exit, in the form of a sleeve housed within the substantially circular duct and having an upstream end and a downstream end;

second valve means deployable within the jet pipe for selectively blocking the second flow exit, in the form of a circular array of valve segments carried on the upstream end of the sleeve of the first valve means and arranged to deploy transversely across the jet pipe to block the second flow exit when the first valve means is translated in a downstream direction to uncover the first flow exit;

wherein:

each segment of the second valve means is pivotally attached to the sleeve of the first valve means at an attachment location towards the circumference of the valve array whereby the segments of the second valve means lie flush with inner faces of the first valve means in a stowed position;

the duct wall in a region adjacent the upstream edge of the first flow exit is formed with an outwardly sloping ramp section; and the segments in the region of the first flow exit have extended tips which project upstream of the attachment location such that as the second valve means begins to deploy transversely across the jet pipe, the extended tips sweep the outwardly sloping ramp section of the duct wall;

whereby the tips of the extended valve segments cooperate with the ramp section of the duct wall during deployment of the second valve means to delay opening of the first flow exit by the first valve means.

10. A fluid flow duct as claimed in claim 9, whereby the inner faces of the first valve means are profiled to receive the segments of the second valve means.

11. A fluid flow duct as claimed in claim 9 wherein the extended tips sweep outwardly of the entire first valve means.

12. A fluid flow duct as claimed in claim 9 wherein the segments in the region of the first flow exit are of greater length than segments that are not in the region of the first flow exit, so that the extended tips extend farther from a center of the circular array of valve segments than tips of the segments that are not in the region of the first flow exit.

13. A fluid flow duct as claimed in claim 9 wherein the first flow exit comprises apertures formed on opposite sides of the duct.

14. A fluid flow duct as claimed in claim 13 wherein said apertures are formed on port and starboard sides of the duct.

15. A fluid flow duct as claimed in claim 9 wherein the angular position of the second valve segments relative to the first valve sleeves is controlled by at least one strut having a first end pivotally attached toward the radially inner end of the segments.

16. A fluid flow duct as claimed in claim 15 wherein the at least one strut has a second end opposite to the first end pivotally attached to an axial member in the fluid flow duct.

17. A fluid flow duct having a flow entry and alternatively selectable first and second flow exits, wherein an upstream end of the duct defines the flow entry, at least one side aperture formed in a wall of the duct defines the first flow exit, and a downstream end of the duct defines the second flow exit, and including valve means for alternatively blocking the first flow exit or the second flow exit;

said valve means comprising:

axially translatable first valve means for selectively blocking the first flow exit, in the form of a sleeve having an upstream end and a downstream end;

second valve means for selectively blocking the second flow exit, in the form of a circular array of valve segments carried on the upstream end of the first valve means and arranged to deploy transversely across the duct to block the second exit when the first valve means is translated in a downstream direction to uncover the first flow exit;

wherein:

each segment of the second valve means is pivotally attached to the sleeve of the first valve means at an attachment location towards the circumference of the valve array;

the segments at least in the region of the first flow exit have extended tips which project upstream of the attachment location such that during initial deployment of the valve means the extended segment tips sweep outwardly of the entire first valve means, and the duct wall is correspondingly profiled to co-operate with the extended segment tips to delay opening of the side flow exit by the first valve means; and the segments in the region of the first flow exit are of greater length than segments that are not in the region of the first flow exit, so that the extended tips extend farther from a center of the circular array of valve segments than tips of the segments that are not in the region of the first flow exit.

18. A fluid flow duct as claimed in claim 17, wherein the segments of the second valve means lie flush with inner faces of the first valve means in a stowed position.

19. A fluid flow duct as claimed in claim 17, further comprising a core engine and a bypass duct that exhaust gas into the fluid flow duct, wherein the valve means diverts exhaust flow from the core engine and bypass flow from the bypass duct.

* * * * *